(12) United States Patent
Ting

(10) Patent No.: US 10,237,646 B1
(45) Date of Patent: Mar. 19, 2019

(54) TRAVEL REAL-TIME VOICE TRANSLATION MICROPHONE FOR MOBILE PHONE

(71) Applicant: Shao-Chieh Ting, New Taipei (TW)

(72) Inventor: Shao-Chieh Ting, New Taipei (TW)

( * ) Notice: Subject to any disclaimer, the term of this patent is extended or adjusted under 35 U.S.C. 154(b) by 0 days.

(21) Appl. No.: 15/691,329

(22) Filed: Aug. 30, 2017

(51) Int. Cl.

| | | |
|---|---|---|
| *H04R 3/00* | (2006.01) | |
| *H04R 1/40* | (2006.01) | |
| *H04M 1/03* | (2006.01) | |
| *G10L 21/0208* | (2013.01) | |
| *H04R 1/08* | (2006.01) | |
| *H04R 19/04* | (2006.01) | |
| *H04R 1/04* | (2006.01) | |
| *H04M 1/725* | (2006.01) | |
| *H04M 1/60* | (2006.01) | |
| *H04R 1/34* | (2006.01) | |
| *H04R 5/027* | (2006.01) | |
| *H04R 1/32* | (2006.01) | |

(52) U.S. Cl.
CPC .......... *H04R 1/406* (2013.01); *G10L 21/0208* (2013.01); *H04M 1/03* (2013.01); *H04R 1/04* (2013.01); *H04R 1/086* (2013.01); *H04R 3/005* (2013.01); *H04R 19/04* (2013.01); *H04M 1/60* (2013.01); *H04M 1/6033* (2013.01); *H04M 1/725* (2013.01); *H04M 1/72522* (2013.01); *H04M 1/72527* (2013.01); *H04M 2242/12* (2013.01); *H04M 2250/58* (2013.01); *H04R 1/08* (2013.01); *H04R 1/32* (2013.01); *H04R 1/342* (2013.01); *H04R 5/027* (2013.01); *H04R 2201/003* (2013.01); *H04R 2410/07* (2013.01); *H04R 2420/09* (2013.01); *H04R 2499/11* (2013.01)

(58) Field of Classification Search
CPC .......... H04R 1/406; H04R 1/04; H04R 1/086; H04R 3/005; H04R 19/04; H04R 2201/003; H04R 2410/07; H04R 2420/09; H04R 2499/11; H04R 1/32; H04R 1/342; H04R 1/08; H04R 5/027; H04M 1/03; H04M 1/7252; H04M 2242/12; H04M 2250/58; H04M 1/60; H04M 1/725; H04M 1/72527; H04M 1/6033; G10L 21/0208

USPC .................................... 381/92, 26, 356, 357
See application file for complete search history.

(56) References Cited

U.S. PATENT DOCUMENTS

| | | | | |
|---|---|---|---|---|
| 2014/0161295 | A1* | 6/2014 | Huang | H04R 1/406 381/357 |
| 2016/0066074 | A1* | 3/2016 | Iori | H04R 5/027 381/26 |
| 2016/0112817 | A1* | 4/2016 | Fan | H04R 29/004 381/94.7 |

* cited by examiner

*Primary Examiner* — Paul Kim
*Assistant Examiner* — Ubachukwu A Odunukwe
(74) *Attorney, Agent, or Firm* — Michael D. Eisenberg

(57) ABSTRACT

The embodiments of the invention disclosed are configured with a voice translation software, and can be readily used after switching off the microphone of the mobile phone and inserted into the charging port of the mobile phone. In some embodiments, the invention comprises two microphones; when the mobile phone is directed at a speaker, the audio pickup is performed by using a "hypercardioid noise-filtering microphone", and when the mobile phone is directed at oneself, the audio pickup is performed by using a "cardioid noise-filtering microphone", such that the surrounding noises can be prevented from being picked up in order to achieve an accurate and fluent voice translation. In other embodiments, when the microphone is used to ask for directions or in communication while travelling abroad in particular, this use enables the user to keep an adequate distance from the opposite party in keeping with the international social etiquette.

4 Claims, 16 Drawing Sheets

Step 6

US 10,237,646 B1

TRAVEL REAL-TIME VOICE TRANSLATION MICROPHONE FOR MOBILE PHONE

FIELD OF THE INVENTION

The present invention relates to media technologies and more particularly to a microphone technology applicable to a mobile phone technology.

BACKGROUND

The rapid development of the smart phones and their application software has demonstrated great market outlook and creative potential for mobile devices of the mobile phones to the inventor. Consequently, a diversity of peripheral products are born from such demonstration, with the microphones for mobile phones being one of them.

However, the common microphones for mobile phones mostly have a single directional microphone head provided at one single direction, or are excessively large in their sizes and involve complex production and assembly steps. For the microphone having a single directional head, it is necessary to adjust the direction of the microphone and aim the microphone at a person whose voice needs to be picked up to achieve a better effect for the voice translation when it is applied in the real-time voice translation of embodiments of the present invention, and the distance between the phone holder and the speaker cannot be too far, otherwise the surrounding noises are picked up instead and thus affecting the quality of the voice translation, but it would be impolite if the distance gets too close. Further, an excessively large microphone blocks off the earphone socket or the speaker in some of the phones, and thus affecting the normal use of their functions.

It is therefore obvious that the above-mentioned conventional microphone devices for mobile phones are disadvantageous and are inadequately designed, which urgently require an improvement.

In light of the aforesaid disadvantages, the problems of the prior art are resolved by the embodiments of the travel real-time voice translation microphone for a mobile phone.

SUMMARY OF THE INVENTION

An object of this disclosure is to provide a "travel real-time voice translation microphone for a mobile phone" comprising a pair of microphones, a base, a PCB (Printed Circuit Board) component and a pair of enclosing pieces of the PCB component.

Another object is to provide a microphone technology applicable to a mobile phone, and more particularly to a microphone having two different directional microphone heads that are respectively provided at one of two opposing directions, and used in combination with a real-time voice translation software installed in the mobile phone. When the translation software of the mobile phone has been configured to translate a language that requires translation, a user can perform a voice input into the microphone of the mobile phone, and then the voice input will be translated into a language an opposite party is familiar with in real time, so as to achieve a fluent conversation between the user and the opposite party.

In some embodiments, the head that is directed to face a speaker uses a "hypercardioid noise-filtering microphone" for audio pickup and can achieve clear audio pickup within a fixed distance, so as to maintain a socially polite distance from the speaker; the head that is directed to face a phone holder uses a "cardioid noise-filtering microphone" for audio pickup and can achieve a clear audio pickup regardless of how the phone is rotated at certain angles during use, so as to achieve an accurate real-time voice translation on a mobile phone during travelling.

To enable a further understanding of the said objectives and the technological methods of the invention herein, the brief description of the drawings below is followed by the detailed description of embodiments disclosed herein.

DETAILED DESCRIPTION OF THE EMBODIMENTS

Figure 1A:
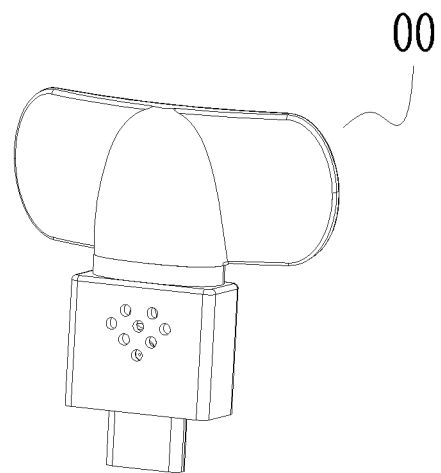
FIG. 1A is a three-dimensional schematic view of a MEMS (Micro-electro-mechanical System) microphone of the travel real-time voice translation microphone for a mobile phone according to embodiments of the present invention.
Figure 1B:
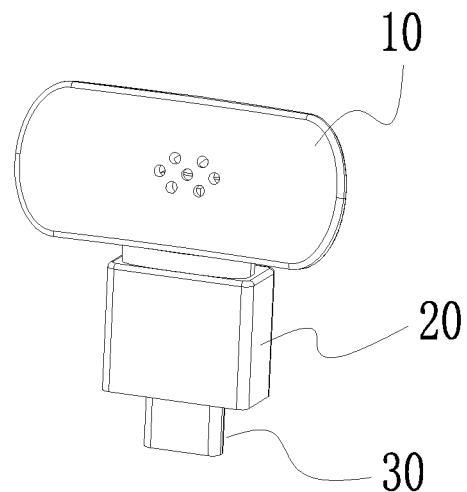
FIG. 1B is a three-dimensional schematic view at another viewing angle of the MEMS microphone of the travel real-time voice translation microphone for a mobile phone according to embodiments of the present invention.
Figure 2A:
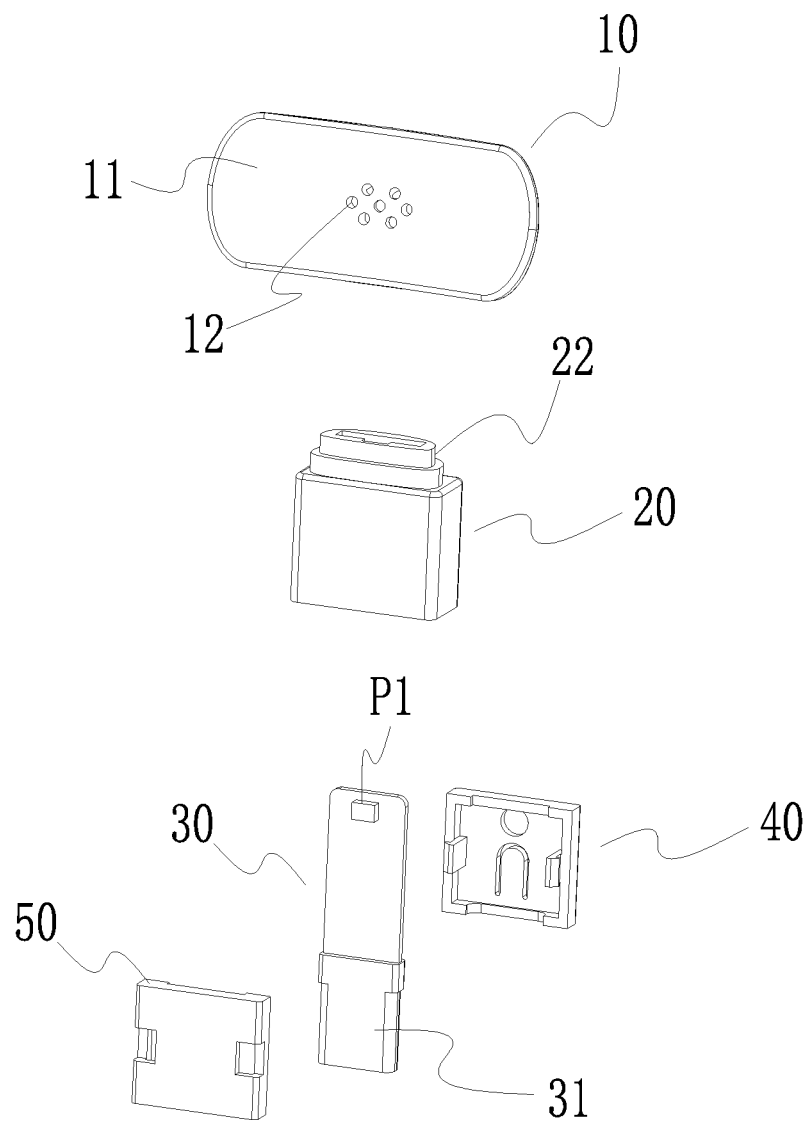
FIG. 2A is a three-dimensional schematic exploded view of the MEMS microphone of the travel real-time voice translation microphone for a mobile phone according to embodiments of the present invention.
Figure 2B:
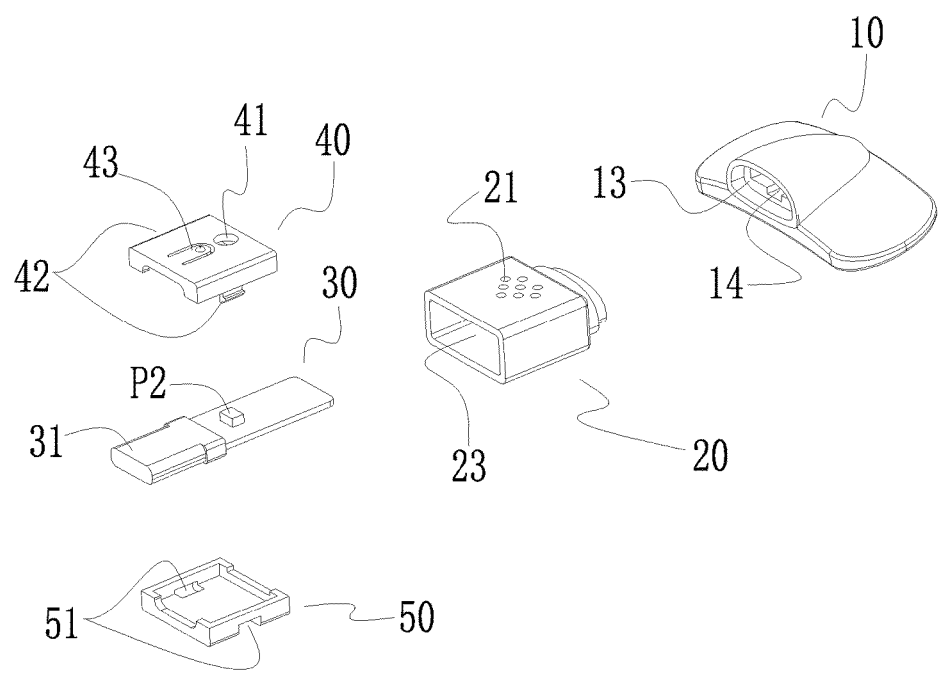
FIG. 2B is a three-dimensional schematic exploded view at another viewing angle of the MEMS microphone of the travel real-time voice translation microphone for a mobile phone according to embodiments of the present invention.

In order to facilitate better understanding of the aforesaid and other purposes, characteristics and advantages of the apparatus and applications disclosed herein, two embodiments are described and explained. These embodiments are exemplary.

FIGS. 1A, 1B, 2A and 2B are three-dimensional schematic views and three-dimensional schematic exploded views showing a micro-electro-mechanical system (MEMS) microphone 00 of the travel real-time voice translation microphone for a mobile phone, which mainly comprises:

a microphone cover 10, a base 20, a PCB component 30 and left and right enclosing pieces 40/50 of the PCB component, wherein:

the microphone cover 10 is sleeved onto a portion of the PCB component, and is disposed in a shape of a transverse concaved arc, has a concaved surface 11 provided with a plurality of air holes 12 thereon and used to face a speaker so as to accurately pick up a sound from the speaker; has a notched step 13 provided thereunder so as to be sleeved onto and adhered to a protruding step 22 of the base 20; a receding hole 14 of the PCB component;

the base 20 is used to connect to the microphone cover 10 and clip onto the left and right enclosing pieces 40/50 of the PCB component 30, and has a plurality of air holes 21 provided on a side thereof facing a microphone holder so as to pick up a sound from the microphone holder; a protruding step 22 is used to be sleeved on and adhered to the notched step 13 of the microphone cover 10; a PCB component 30 and an accommodating space 23 thereof between the enclosing pieces;

the PCB component 30 of a micro-electro-mechanical system (MEMS) is disposed with an adapter 31 (for example, Type-C or Lightning) having a MEMS microphone head P2 of a "cardioid noise-filtering microphone" provided on a PCB at a proximal end thereof, so as to realize audio pickup of a phone holder within an effective use range; the adapter 31 has a MEMS microphone head P1 of a "hypercardioid noise-filtering microphone" provided on another side on the PCB at a distal end thereof, so as to realize accurate audio pickup of a speaker within a socially polite distance, and achieve more accurate and fluent real-time voice translation on a mobile phone. In comparison to the traditional ECM (Electret Condenser Microphone) microphones, the MEMS microphones are smaller in size, consume less power and have relatively higher stability; they possess better filtering capability with respect to the signal interference from the surrounding environment; and the left and right enclosing pieces 40/50 of the PCB component are used to secure the PCB component 30 of a MEMS, and clip on and connect to the base 20. The left enclosing piece 40 of the PCB component has an air hole 41 for a microphone head and a plurality of clips 42 for mutually clipping onto and connecting to a clip-on notch 51 provided on the right enclosing piece 50 of the PCB component; a U-shaped elastic clip 43 is provided for clipping into one of the air holes 21 provided on the base 20 to achieve mutual fastening.

Figure 3:
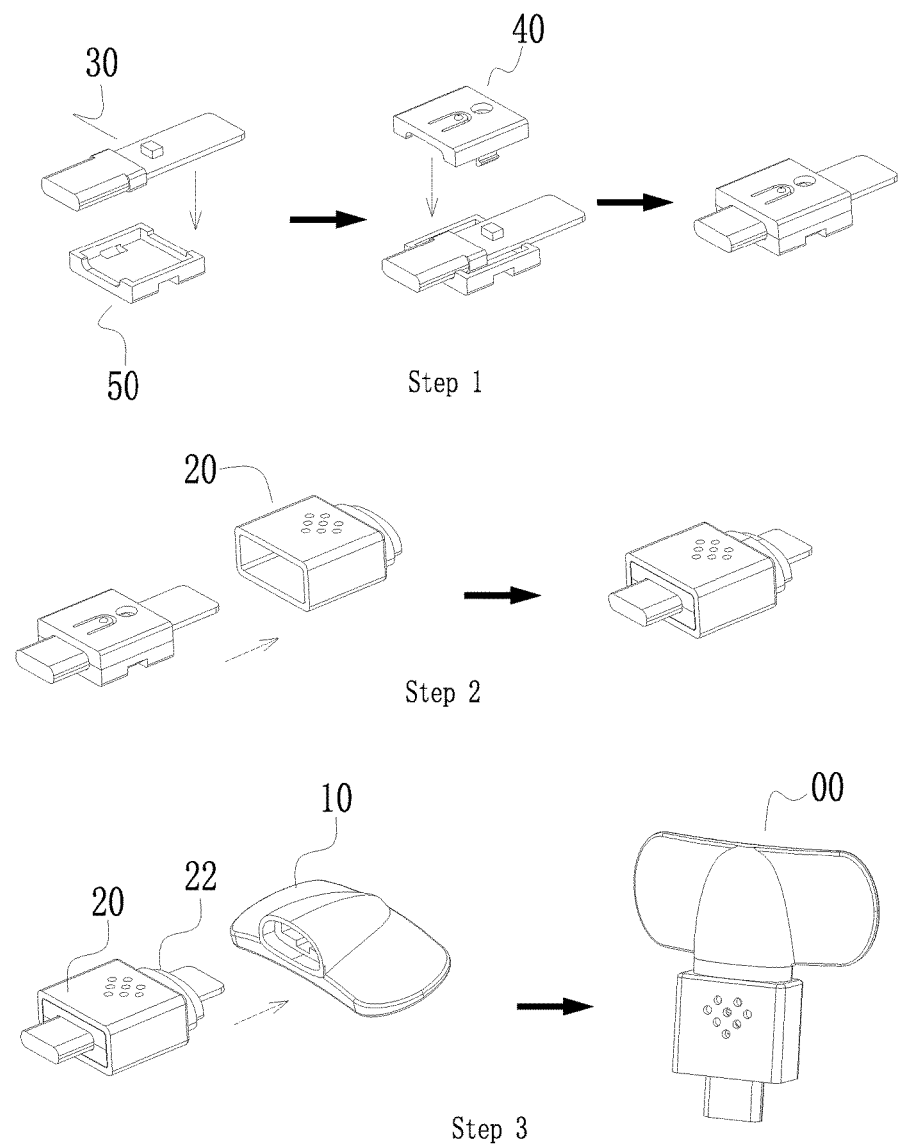
FIG. 3 is a schematic view of assembly steps of the MEMS microphone of the travel real-time voice translation microphone for a mobile phone according to embodiments of the present invention.

Refer to FIG. 3, which is a schematic view of assembly steps for the MEMS microphone 00 of the travel real-time voice translation microphone for a mobile phone according to embodiments of the present invention. The steps comprises:

Step 1: placing the PCB component 30 into the right enclosing piece 50 of the PCB component for positioning, and clipping the left enclosing piece 40 of the PCB component into the right enclosing piece 50 of the PCB component;

Step 2: sleeving the component completed in the previous step into the base 20 to fix the components by clipping;

Step 3: evenly applying a glue on the protruding step 22 of the base 20 and sleeving on the microphone cover 10 for adhering, so as to complete assembly of the product.

Figure 4:
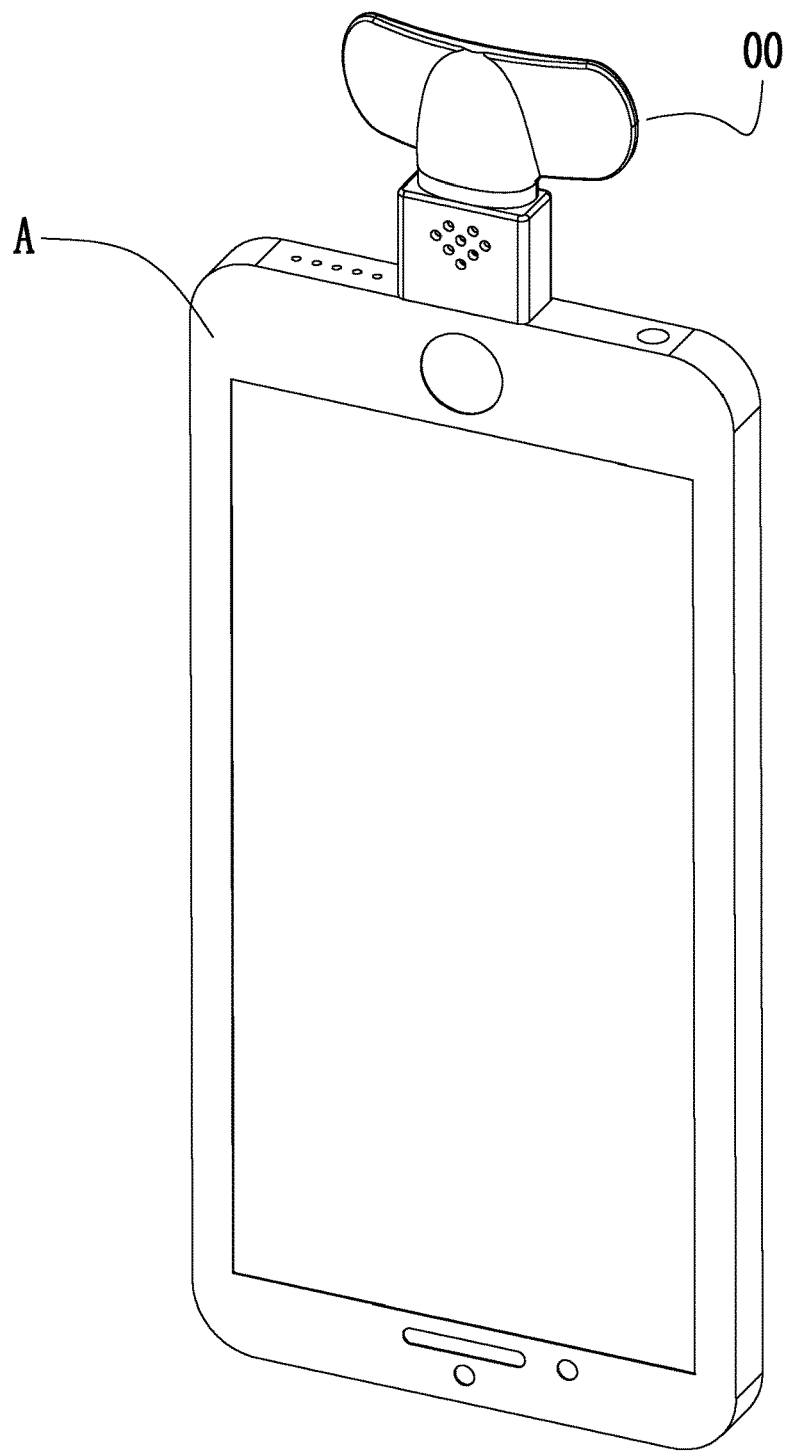
FIG. 4 is a schematic view showing the MEMS microphone of the travel real-time voice translation microphone for a mobile phone being inserted into a mobile phone for use according to embodiments of the present invention.

Refer to FIG. 4, which is a schematic view showing the MEMS microphone 00 of the travel real-time voice translation microphone for a mobile phone being inserted into a mobile phone A for use according to embodiments of the present invention. Prior to using the real-time voice translation software, a microphone of the mobile phone can be switched off by using the settings function of the mobile phone or a customized APP, so as to prevent surrounding noises from being picked up and achieve an accurate and fluent voice translation.

Figure 5A:
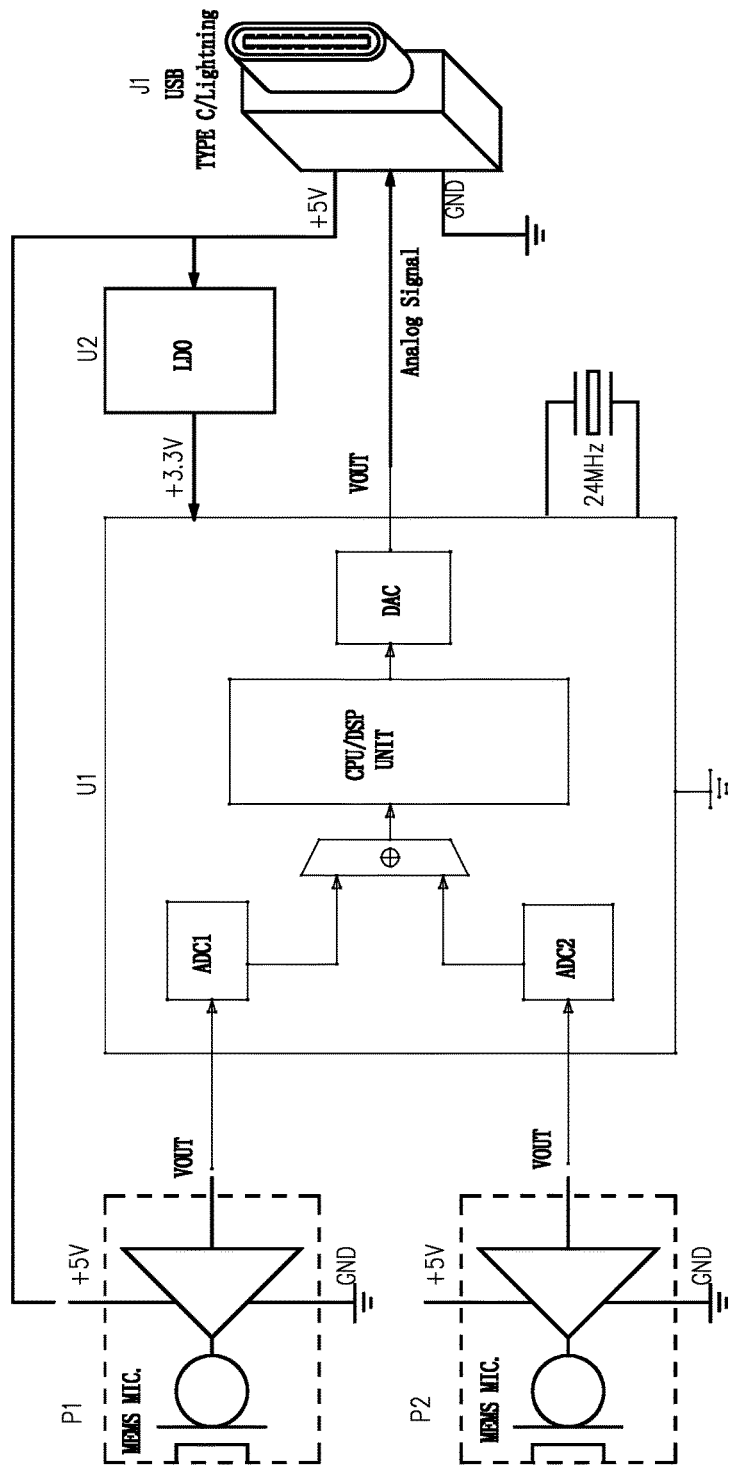
FIG. 5A is a schematic view showing a design of an output analog signal circuit of the MEMS microphone of the travel real-time voice translation microphone for a mobile phone according to embodiments of the present invention.
Figure 5B:
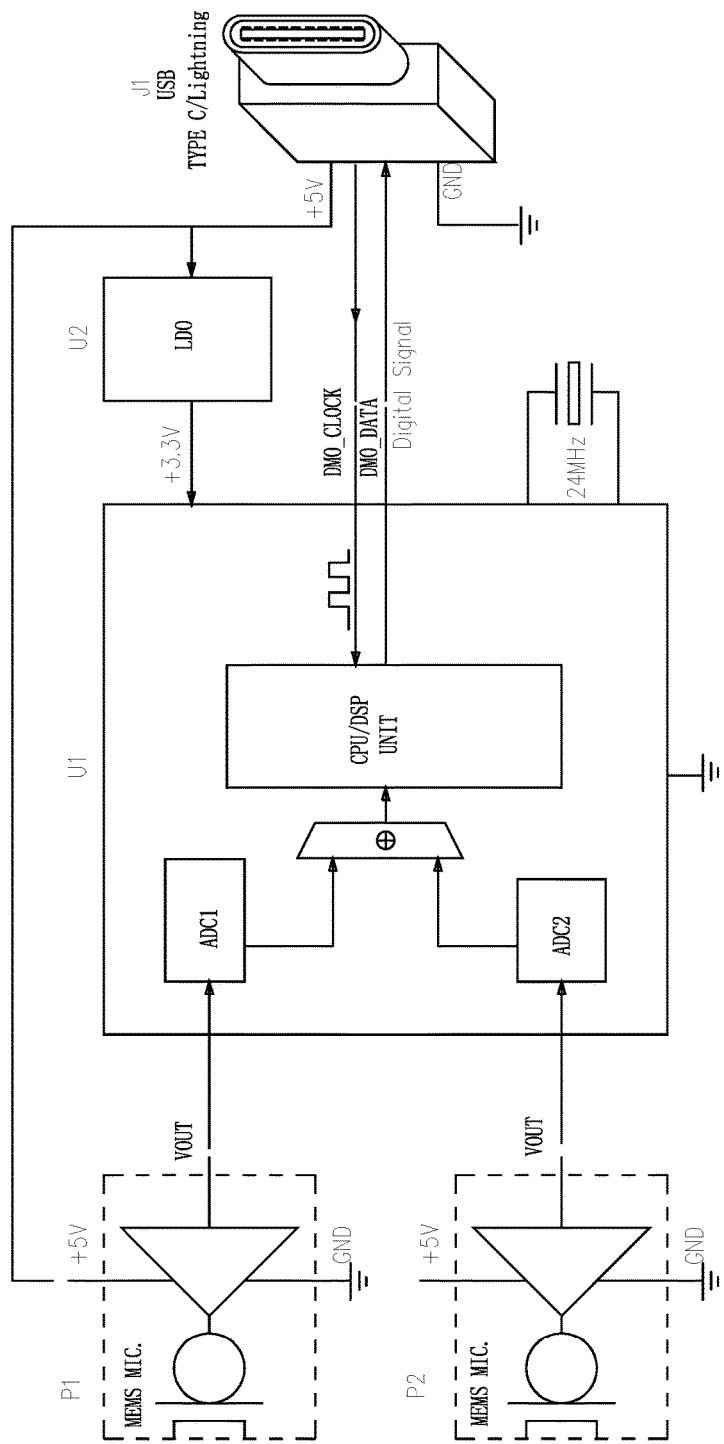
FIG. 5B is a schematic view showing a design of an output digital signal circuit of the MEMS microphone of the travel real-time voice translation microphone for a mobile phone according to embodiments of the present invention.
Figure 6A:
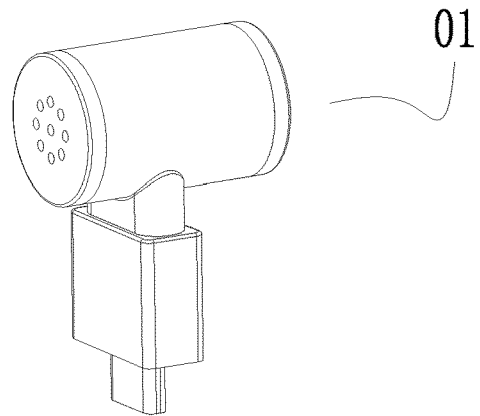
FIGS. 6A-6B are three-dimensional schematic views of an electret condenser microphone (ECM) of the travel real-time voice translation microphone for a mobile phone according to embodiments of the present invention.
Figure 6B:
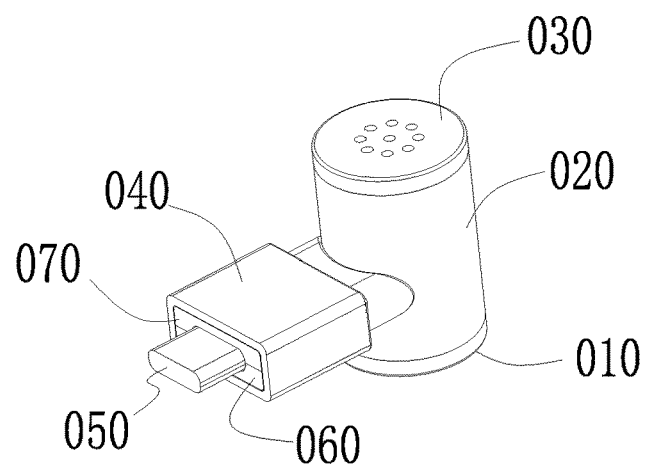
Figure 7A:
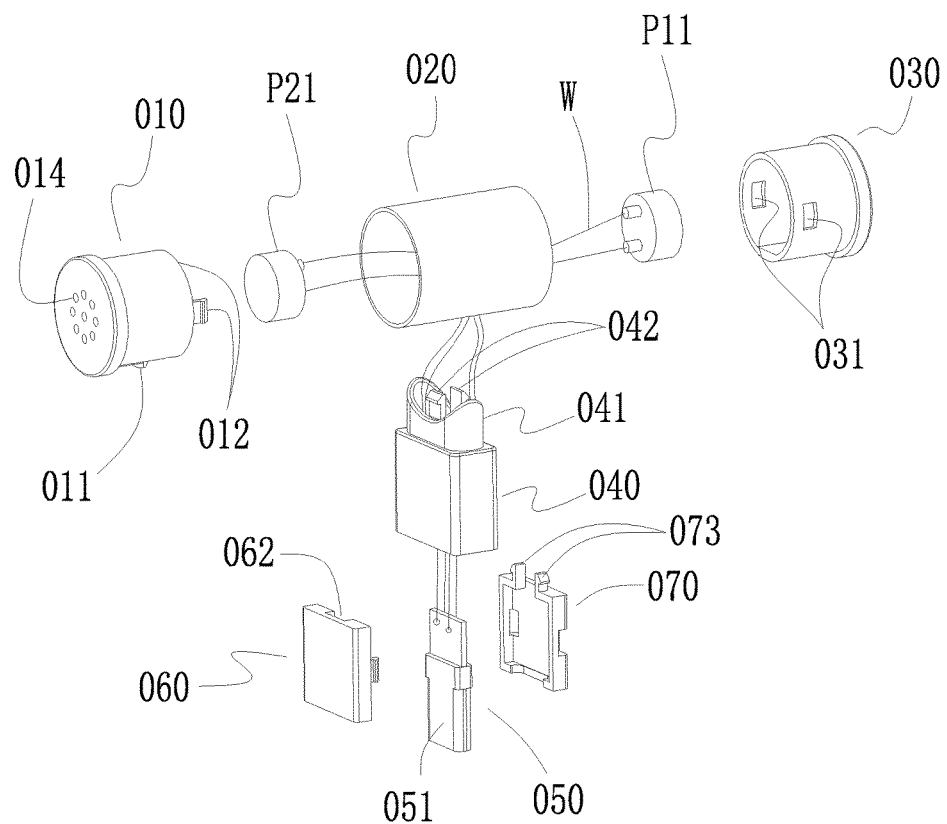
FIGS. 7A-7B are three-dimensional schematic exploded views of the ECM of the travel real-time voice translation microphone for a mobile phone according to embodiments of the present invention.
Figure 7B:
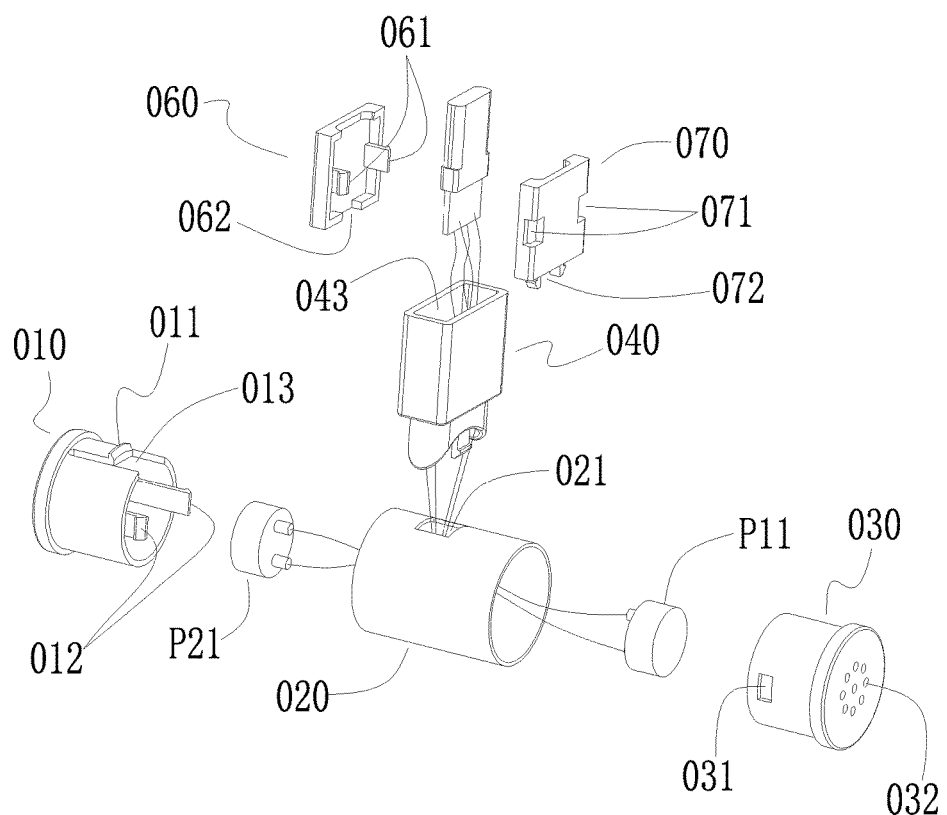

Refer to FIGS. 5A and 5B, which are schematic view showing electronic circuits for the MEMS microphone 00 of the travel real-time voice translation microphone for a mobile phone according to embodiments of the present invention. The product is comprised of two MEMS microphones head P1/P2, a central processing unit (CPU)/a digital signal processor (DSP), and a Type-C or Lightning adapter; P1 is directed to face a speaker, P2 is directed to face a holder, and signals from the two microphones are converted into digital signals via an analog-to-digital converter (ADC) and then inputted to the central processing unit (CPU), the central processing unit (CPU) has a digital signal processor (DSP) for cancelling out environmental noises in the signals in order to obtain a high-quality signal output, and the outputted signals can be set as analog signals or digital signals according to the mobile phone.

Refer to FIGS. 6A, 6B, 7A and 7B, which are three-dimensional schematic views and three-dimensional schematic exploded views of an electret condenser microphone 01 of the travel real-time voice translation microphone for a mobile phone according to another embodiment of the present invention, which mainly comprises:

a left microphone cover 010, an electret condenser microphone head component P21, a hollow tube 020, a right microphone cover 030, an electret condenser microphone head component P11, a base 040, an electret condenser PCB component 050 and left and right enclosing pieces 060/070 of the PCB component, wherein:

the left microphone cover 010 is sleeved onto the electret condenser microphone head component P21 and has a plurality of elastic clips 011 and clips 012 provided thereon for respectively clipping onto the hollow tube 020 and a notched hole 031 on the right microphone cover 030; a notched hole 013 is provided for connecting wires W between the left and the right microphone heads and the PCB component to pass through and clip onto the base 040; a plurality of air holes 014;

the hollow tube 020 is used to enclose the left and the right microphone covers 010/030 and has a square hole 021 provided on a circular surface thereof for enabling the connecting wires W between the microphone heads and the PCB component to pass through and clip onto clips provided on the base 040;

the electret condenser microphone head component P21 is widely applied due to characteristics thereof including a smaller size, a simple structure, a good electrical sound performance and a low cost; P21 is directed to face a holder and uses "the cardioid noise-filtering microphone" to clearly pick up a sound of the phone holder within a fixed range;

the right microphone cover 030 is sleeved onto the electret condenser microphone head component P11 and has a plurality of notched holes 031 and a plurality of air holes 032 provided thereon for mutually clipping to the left microphone cover 010 and achieving fastening therebetween;

the electret condenser microphone head component P11 is directed to face a speaker and uses "hypercardioid noise-filtering microphone" to realize clear audio pickup within a fixed distance, thereby enabling the voice translation to be more accurate;

the base 040 is used to connect the microphone cover components and clip to the left and the right enclosing pieces 060/070 of the PCB component; a hollow protruding platform 041 is provided for shielding off the connecting wires W between the microphone heads and the PCB component and realizing clipping between the PCB component and the enclosing pieces; the hollow protruding platform 041 has a plurality of clips 042 provided at two sides thereof for clipping to the components; an accommodating space 043 for the PCB component is provided between the enclosing pieces;

the electret condenser PCB component 050 has an adapter 051 which can be a Type-C or a Lightning adapter; and the left and right enclosing pieces 060/070 of the PCB component are used to secure the electret condenser PCB component 050 and clip on and connect to the base 040. The left enclosing piece 060 of the PCB component has a plurality of clips 061 provided thereon for mutually clipping and connecting to a clip-on notch 071 provided on the right enclosing piece 070 of the PCB component; a wiring notch 062/072. The right enclosing piece 070 of the PCB component also has a plurality of clips 073 provided thereon for achieving clipping and fastening with the base 040.

Figure 8A:
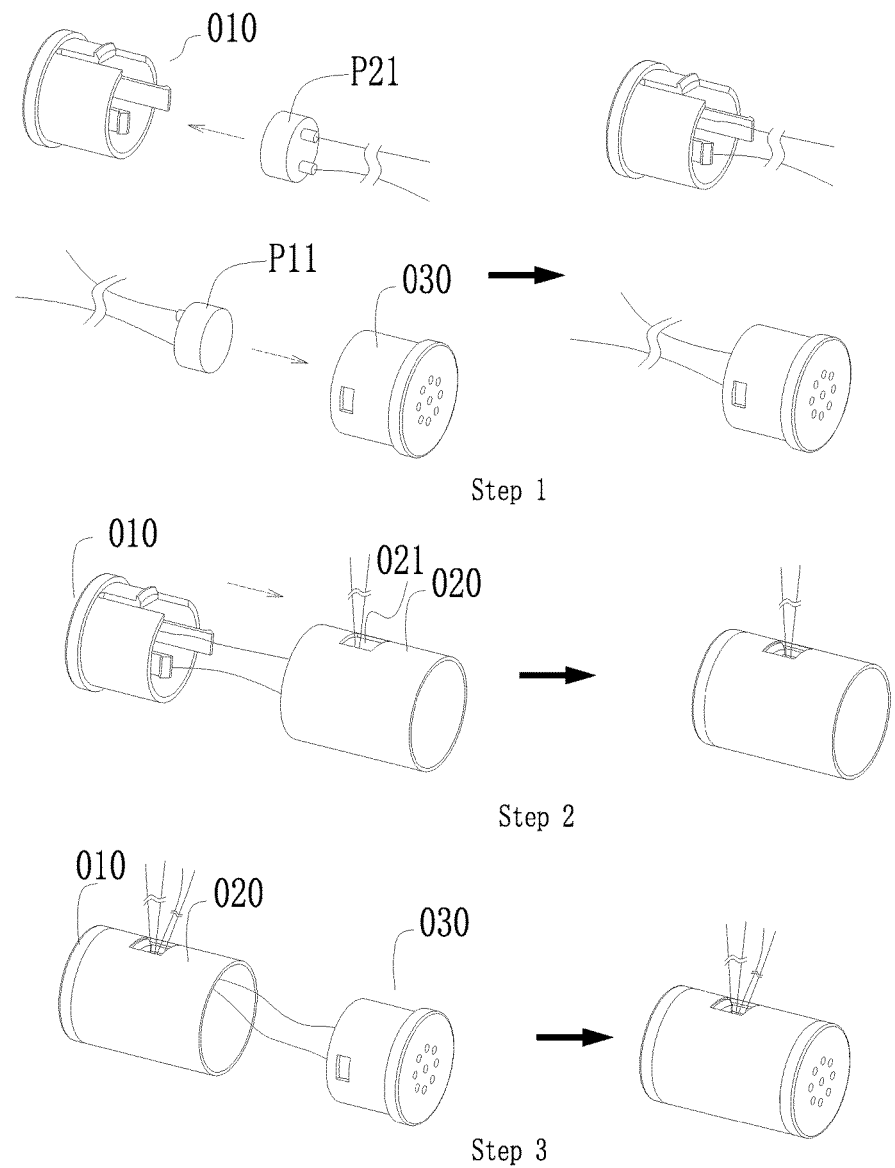
FIGS. 8A-8C are schematic views of assembly steps of the ECM of the travel real-time voice translation microphone for a mobile phone according to embodiments of the present invention.
Figure 8B:
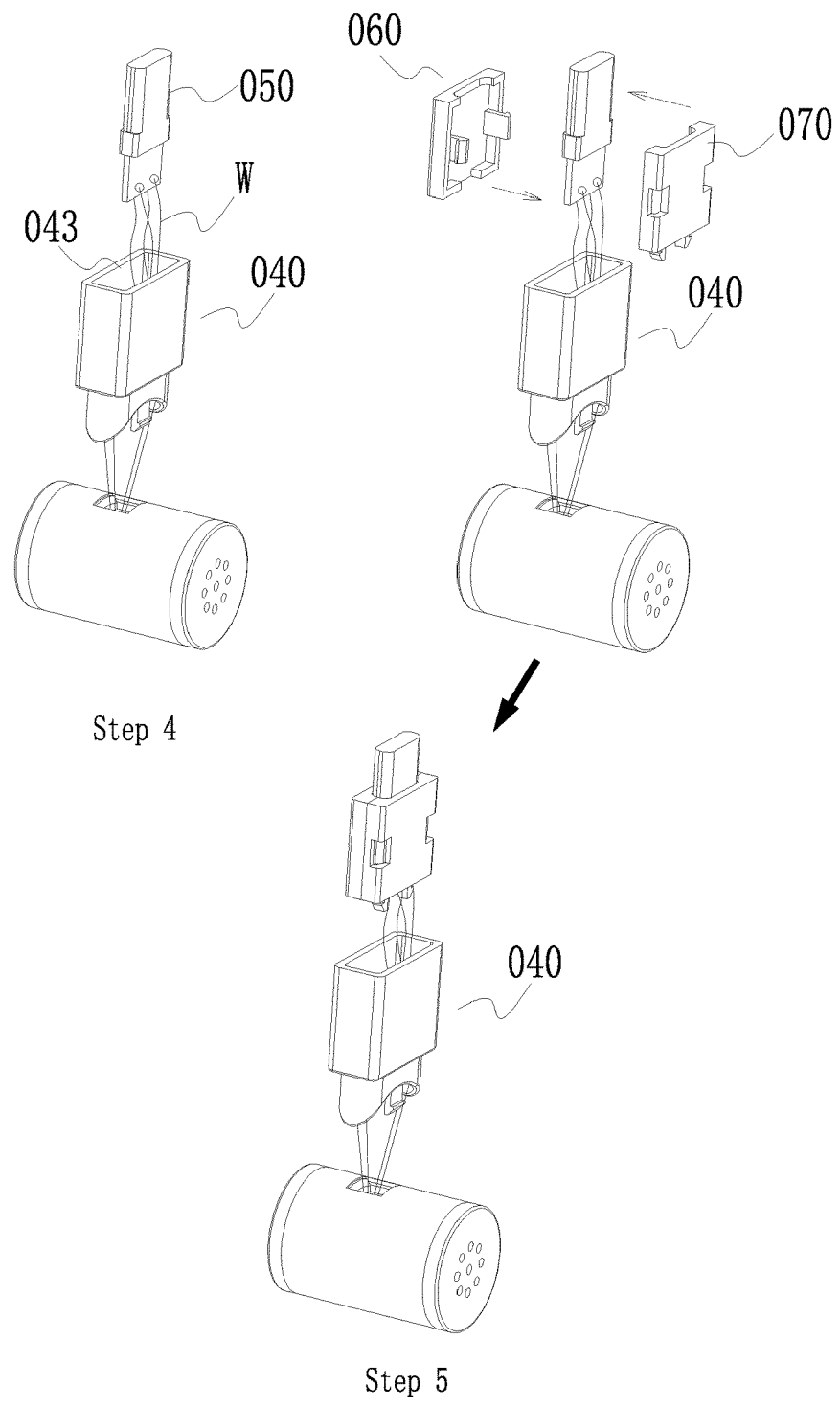
Figure 8C:
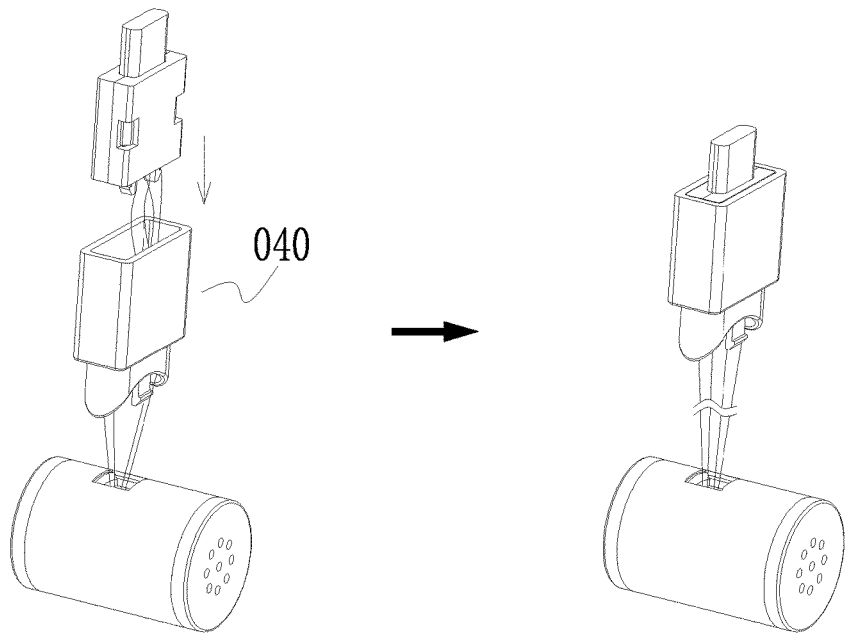
Figure 8C:
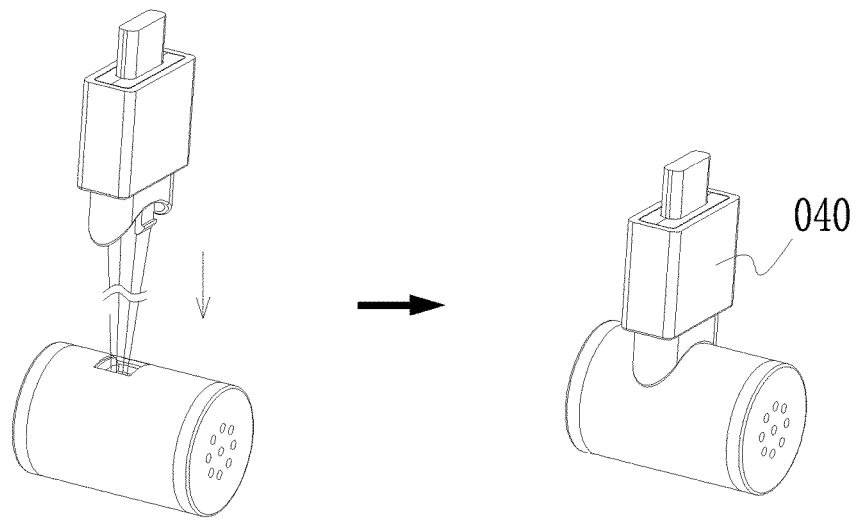

Refer to FIGS. 8A-8C, which are schematic views of assembly steps for the ECM 01 of the travel real-time voice translation microphone for a mobile phone according to embodiments of the present invention. The steps comprises:

Step 1: respectively soldering microphone heads and connecting wires W of the PCB component having an adequate length to the left and the right electret condenser microphone heads P21/P11, and placing the same into the left and the right microphone covers 010/030 for positioning and fastening; Step 2: passing the connecting wires W connecting the microphone head and the PCB component on the left through the square hole 021 of the hollow tube, and placing the left microphone cover component 010 into the hollow tube 020 for clipping on and positioning;

Step 3: passing the connecting wires W connecting the microphone head and the PCB component on the right through the square hole 021 of the hollow tube, and placing the right microphone cover component 030 into the hollow tube 020 for clipping on and positioning with the left microphone cover component 010;

Step 4: passing the connecting wires W between the left and the right microphone heads and the PCB component through the accommodating space 043 of the PCB component between enclosing pieces of the base 040, and soldering the same on the electret condenser PCB component 050;

Step 5: placing the electret condenser PCB component 050 having the connecting wires W between the left and the right microphone heads and the PCB component soldered thereon into the right enclosing piece 070 of the PCB component for positioning, and then clipping the left enclosing piece 060 of the PCB component into the right enclosing piece 070 of the PCB component;

Step 6: fitting the component completed in the previous step into the base 040 to fix the components by clipping;

Step 7: fitting the base 040 component into the square hole of the microphone cover component for clipping and positioning, so as to complete the assembly of the product.

Figure 9:
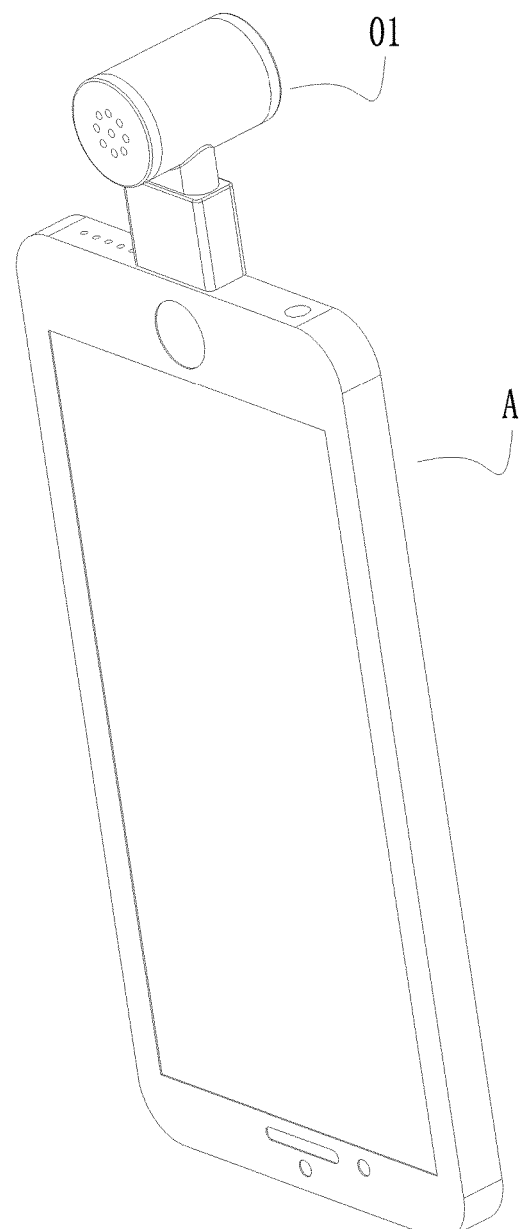
FIG. 9 is a schematic view showing the ECM of the travel real-time voice translation microphone for a mobile phone being inserted into a mobile phone for use according to embodiments of the present invention.

Refer to FIG. 9, which is a schematic view showing the ECM 01 of the travel real-time voice translation microphone for a mobile phone being inserted into the mobile phone A for use according to embodiments of the present invention. In some embodiments, the device is of a small size and does not affect the normal use of earphone socket and speaker of the mobile phone. The disclosed device allows for the use of real-time translation software in mobile phones and provides practical solutions for tourism and international exchanges.

Figure 10A:
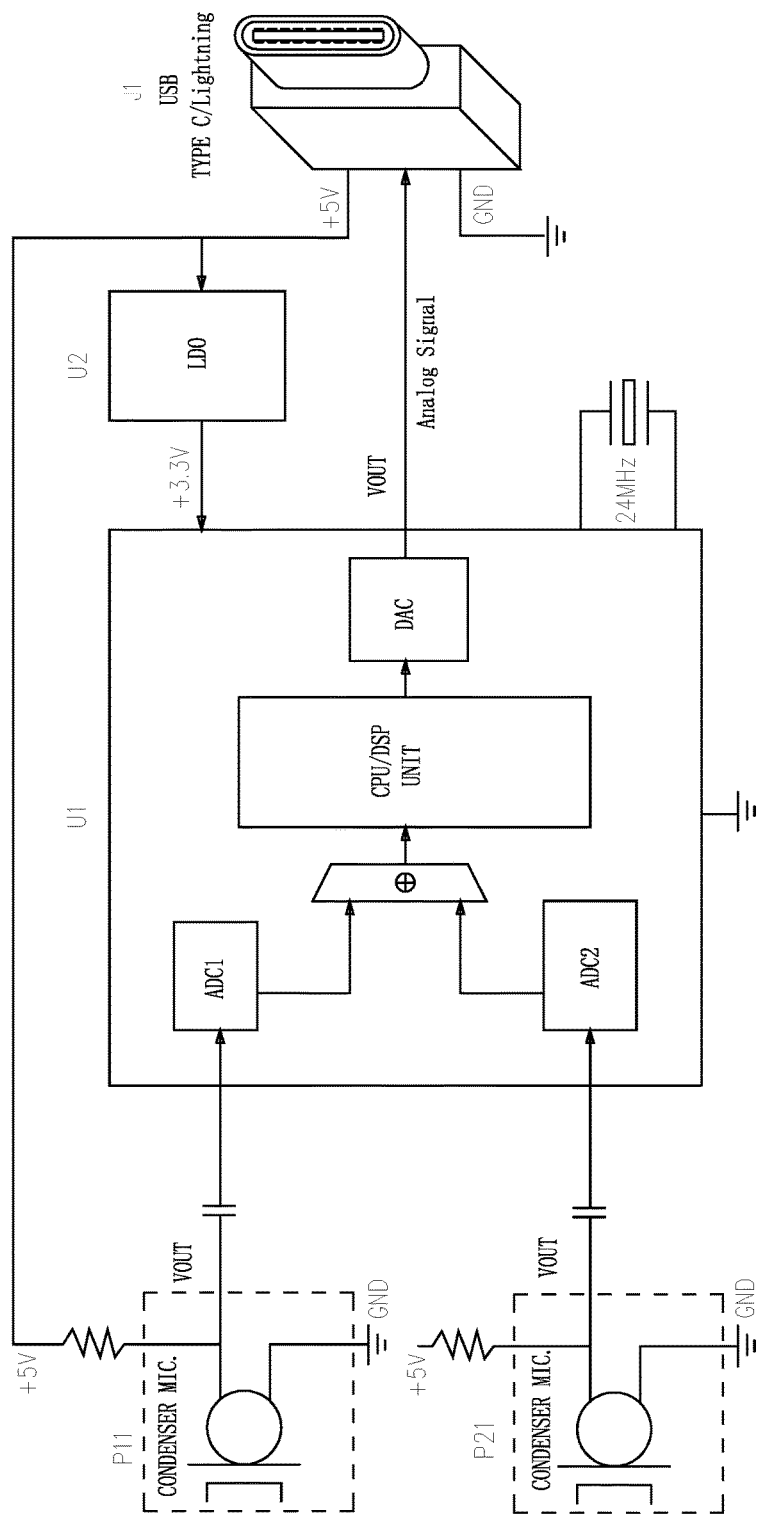
FIGS. 10A-10B are schematic views showing a circuit design of the ECM of the travel real-time voice translation microphone for a mobile phone according to embodiments of the present invention.
Figure 10B:
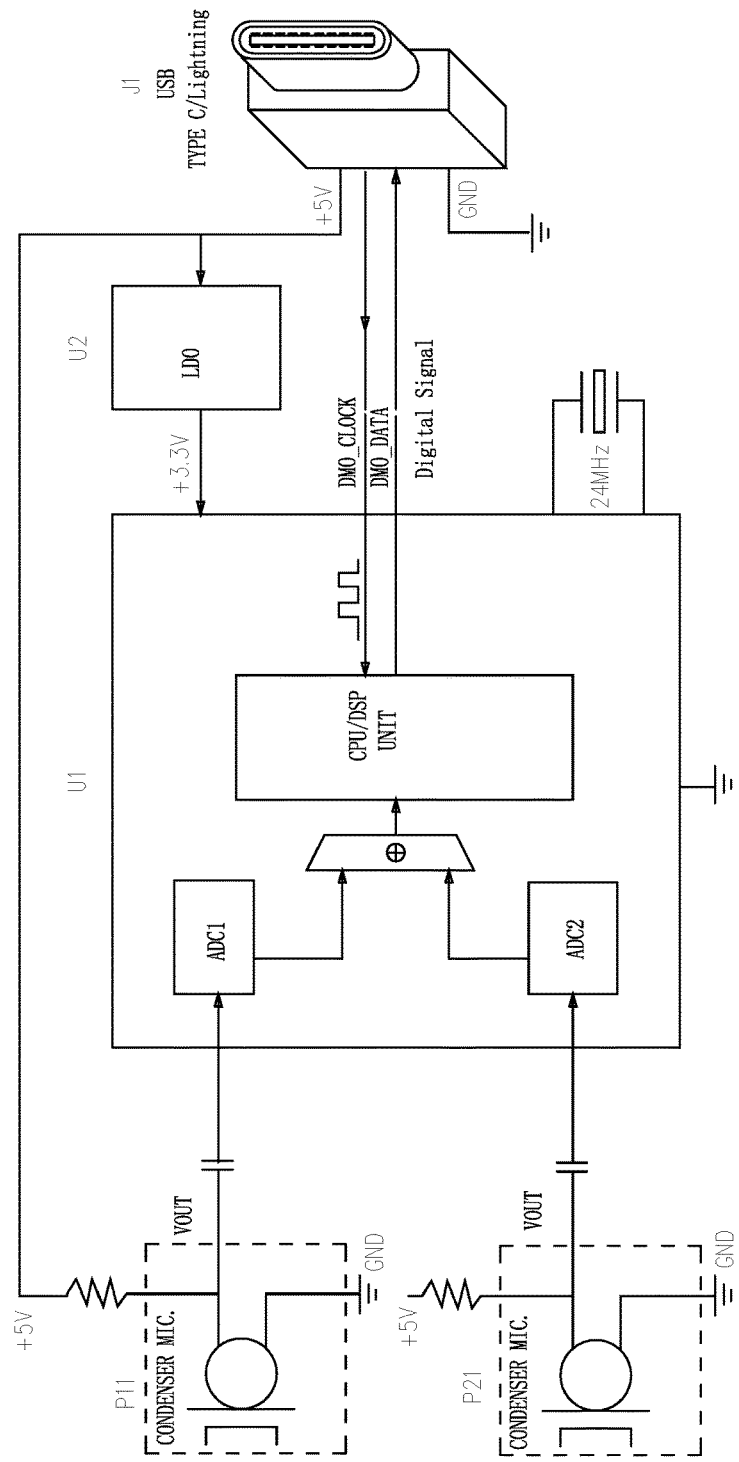

Refer to FIGS. 10A-10B, which are schematic views showing an electronic circuit of the ECM 01 of the travel real-time voice translation microphone for a mobile phone according to embodiments of the present invention. The product is comprised of two electret condenser microphone head component P11/P21, a central processing unit or/digital signal processor (CPU/DSP) and a Type-C or Lightning adapter. A circuit thereof is based on the same circuit described in FIGS. 5A-5B above, and thus the description of FIGS. 5A and 5B correspond to that circuit.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A travel real-time voice translation microphone for a mobile phone, comprising:
    a group of microphone covers including a left and a right microphone covers, a plurality of air holes are provided on the microphone covers and being disposed on two sides of a hollow tube, wherein the left microphone cover is provided with a plurality of elastic clips for clipping to notched holes on the right microphone cover;
    the hollow tube having a square hole provided on a circular surface for connecting wires between microphone heads and a PCB component to pass through and be fitted with a base;
    wherein the base having a hollow protruding platform provided thereon, and a plurality of clips provided on two sides thereof for clipping to the PCB component; and
    an electret condenser PCB component having an adapter provided thereon, and is mutually clipped to and fixed to the clips and clip-on notches of the left and the right enclosing pieces of a PCB component.

2. The travel real-time voice translation microphone for a mobile phone in accordance with claim 1, wherein the heads are provided respectively at one of two opposing directions.

3. The travel real-time voice translation microphone for a mobile phone in accordance with claim 1, wherein one microphone head uses a "cardioid noise-filtering microphone" for audio pickup, and another microphone head uses a "hypercardioid noise-filtering microphone" for audio pickup.

4. A travel real-time voice translation microphone for a mobile phone, comprising:
    two directional microphone heads, wherein the microphone heads are further provided with a "cardioid noise-filtering microphone" and a "hypercardioid noise-filtering microphone" respectively at one of two opposing directions;

a microphone cover, being disposed in a shape of a transverse concaved arc, having a concaved surface provided with a plurality of air holes on the concaved surface for being directed to face a speaker to pick up a sound; and a base, being directed to face a microphone holder, having a plurality of air holes provided on the base to pick up a sound, a space for accommodating a PCB (Printed Circuit Board) component therein, and a protruding step provided thereon for being sleeved on a notched step of the microphone cover.

* * * * *